US009834212B2

(12) United States Patent
Park

(10) Patent No.: US 9,834,212 B2
(45) Date of Patent: Dec. 5, 2017

(54) APPARATUS AND METHOD FOR CONTROLLING VEHICLE USING VEHICLE COMMUNICATION

(71) Applicant: MANDO CORPORATION, Pyeongtaek-si (KR)

(72) Inventor: Man Bok Park, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 24 days.

(21) Appl. No.: 14/801,668

(22) Filed: Jul. 16, 2015

(65) Prior Publication Data
US 2016/0016585 A1 Jan. 21, 2016

(30) Foreign Application Priority Data

Jul. 17, 2014 (KR) .......................... 10-2014-0090138

(51) Int. Cl.
*B60W 30/12* (2006.01)
*H04L 29/08* (2006.01)

(52) U.S. Cl.
CPC ............. *B60W 30/12* (2013.01); *H04L 67/12* (2013.01); *H04L 67/18* (2013.01);
(Continued)

(58) Field of Classification Search
CPC ............. B60W 30/12; B60W 2420/42; B60W 2550/306; B60W 2550/302; B60W 2550/408; H04L 67/12
See application file for complete search history.

(56) References Cited

U.S. PATENT DOCUMENTS 6,038,496 A * 3/2000 Dobler ...................... B60T 7/22
250/559.06
2005/0225457 A1* 10/2005 Kagawa ............... G08G 1/0965
340/995.13
(Continued)

FOREIGN PATENT DOCUMENTS

CN 1611386 5/2005
CN 1929637 3/2007
(Continued)

OTHER PUBLICATIONS

Office Action dated May 12, 2015 for Korean Patent Application No. 10-2014-0090138.
(Continued)

*Primary Examiner* — Jerrah Edwards
*Assistant Examiner* — Majdi Alsomiri
(74) *Attorney, Agent, or Firm* — Ladas & Parry, LLP

(57) ABSTRACT

The present invention relates to a technology of controlling a vehicle using vehicle communication, and more particularly, to a technology of receiving, from an object vehicle or an infrastructure device, object vehicle surrounding information or infrastructure device surrounding information including lane information from the viewpoint of the object vehicle or lane information from the viewpoint of the infrastructure device, and then detecting the object vehicle on the basis of the received object vehicle surrounding information and the received infrastructure device surrounding information, thereby performing vehicle controls such as lane change assistance and lane change control.

12 Claims, 5 Drawing Sheets

(52) U.S. Cl.
CPC ... *B60W 2420/42* (2013.01); *B60W 2550/302* (2013.01); *B60W 2550/306* (2013.01); *B60W 2550/408* (2013.01)

(56) References Cited

U.S. PATENT DOCUMENTS

| | | | |
|---|---|---|---|
| 2009/0140881 A1* | 6/2009 | Sakai | G08G 1/164 340/901 |
| 2009/0237291 A1* | 9/2009 | Sakuma | G01S 5/0072 342/107 |
| 2009/0237293 A1* | 9/2009 | Sakuma | G01S 5/0072 342/146 |
| 2010/0082244 A1* | 4/2010 | Yamaguchi | G08G 1/163 701/532 |
| 2014/0156158 A1* | 6/2014 | Matsuno | G08G 1/167 701/70 |
| 2014/0347484 A1* | 11/2014 | Byun | G06K 9/00798 348/148 |
| 2014/0358420 A1* | 12/2014 | Noh | G01C 21/28 701/409 |
| 2015/0354976 A1* | 12/2015 | Ferencz | G01C 21/3602 382/104 |
| 2016/0096546 A1* | 4/2016 | Chia | B62D 6/08 701/41 |

FOREIGN PATENT DOCUMENTS

| | | |
|---|---|---|
| CN | 101542555 | 9/2009 |
| CN | 201594322 | 9/2010 |
| CN | 102122444 | 7/2011 |
| CN | 102765356 | 11/2012 |
| CN | 103359013 | 10/2013 |
| JP | 2002-367080 A | 12/2002 |
| JP | 2009-126483 A | 6/2009 |
| KR | 10-2008-0004170 A | 1/2008 |
| KR | 10-2012-0135697 A | 12/2012 |

OTHER PUBLICATIONS

Office Action dated Jun. 1, 2017 for Chinese Patent Application No. 201510424677.2 and its English machine translation by Global Dossier.

* cited by examiner

APPARATUS AND METHOD FOR CONTROLLING VEHICLE USING VEHICLE COMMUNICATION

CROSS-REFERENCE TO RELATED APPLICATION

This application claims priority from and the benefit under 35 U.S.C. §119(a) of Korean Patent Application No. 10-2014-0090138, filed on Jul. 17, 2014, which is hereby incorporated by reference for all purposes as if fully set forth herein.

BACKGROUND OF THE INVENTION

1. Field of the Invention

The present invention relates to a technology of controlling a vehicle using vehicle communication, and more particularly, to an apparatus and method for receiving, from an object vehicle, object vehicle surrounding information including lane information from the viewpoint of the object vehicle and then detecting the object vehicle on the basis of the received object vehicle surrounding information, thereby performing vehicle control such as lane change assistance or lane change control.

2. Description of the Prior Art

In recent years, with development of Vehicle-to-Vehicle (V2V) communication or Vehicle-to-Infrastructure (V2I) communication, technologies of transmitting/receiving various types of information between vehicles or between a vehicle and an infrastructure and using the information for driving of a vehicle are proposed.

Such V2V communication or V2I communication is commonly called Vehicle-to-Everything (V2X) communication, and it is predicted that a time when all vehicles have such a V2X communication function will come in the future.

Meanwhile, in recent years, the number of vehicles having an imaging device such as a camera, a proximity sensor such as a radar, etc. is increasing, and a vehicle having an imaging device and a proximity sensor can perform a collision prevention function after an image of a surrounding interest object is recognized using the imaging device, a Lane Keeping Assistance (LKA) control which enables automatic driving by automatically and actively performing control such as steering, etc. not to deviate from a lane after an image of the lane is photographed, a Lane Change Assistance (LCA) control which warns a surrounding vehicle by allowing left and right turn signal lamps to automatically flicker when the vehicle wants to change a lane thereof, or the like.

Further, the vehicle detects a side rear object using a proximity sensor such as a radar, and performs an obstacle warning function, a collision prevention function, a blind spot warning function, etc. on the basis of the detected result.

However, since the imaging device, the radar sensor, or the like have relatively high prices, the image device, the radar sensor, or the like is provided only in a luxury vehicle. Thus, a vehicle not having the imaging device or the radar sensor cannot use various types of driving assistance systems based on such devices.

SUMMARY OF THE INVENTION

In this background, an aspect of the present invention is to provide a system and method for receiving information from an object vehicle using V2X communication of vehicles and then performing a vehicle driving control such as a vehicle related control using the information from the object vehicle and measurement information of a subject vehicle.

Another aspect of the present invention is to provide a method and apparatus for receiving, from an object vehicle, object vehicle surrounding information including lane information from the viewpoint of the object vehicle, using V2X communication of vehicles, converting the received information into lane information based on a subject vehicle, and then performing a vehicle control such as an LKA control and an LCA control using the converted lane information.

In order to achieve the above-described aspects, in accordance with an embodiment of the present invention, an apparatus for controlling a vehicle is provided. The apparatus includes: a communication unit for receiving, from an object vehicle, object vehicle surrounding information including lane information from a viewpoint of the object vehicle, through wireless communication; a measurement unit for measuring vehicle information of a subject vehicle; an object vehicle detection unit for detecting a location and a speed of the object vehicle, using the received object vehicle surrounding information and the vehicle information measured by the measurement unit; and a vehicle control unit for controlling an operation of the subject vehicle using information on the location and the speed of the object vehicle.

In accordance with another embodiment of the present invention, a method of controlling a vehicle is provided. The method includes: an object vehicle surrounding information reception step of receiving, from an object vehicle, object vehicle surrounding information including lane information from a viewpoint of the object vehicle, through wireless communication; a subject vehicle information measurement step of measuring vehicle information of a subject vehicle; an object vehicle detection step of detecting a location and a speed of the object vehicle, using the received object vehicle surrounding information and the measured vehicle information of the subject vehicle; and a vehicle control step for controlling an operation of the subject vehicle using information on the location and the speed of the object vehicle.

In accordance with another embodiment of the present invention, an apparatus for controlling a vehicle is provided. The apparatus includes: a communication unit for receiving, from an infrastructure device near a vehicle, infrastructure device surrounding information including lane information from the viewpoint of the infrastructure device through wireless communication; a measurement unit for measuring vehicle information of a subject vehicle; a lane information conversion unit for converting the first lane information from the viewpoint of the infrastructure device into second lane information from the viewpoint of the subject vehicle using the received infrastructure device surrounding information and the vehicle information measured by the measurement unit; and a vehicle control unit for controlling an operation of the subject vehicle relating to a lane using the converted second lane information.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, some embodiments of the present invention will be described with reference to the accompanying drawings. In the description of the elements of the present invention, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
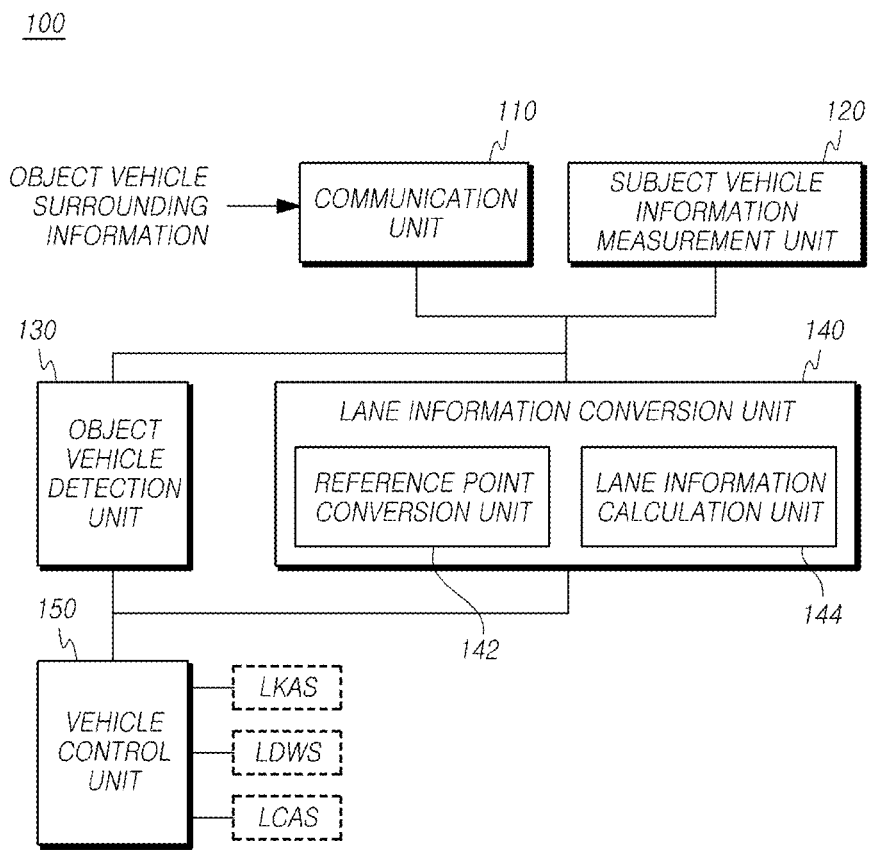
FIG. 1 is a block diagram illustrating a vehicle control apparatus according to an embodiment of the present invention.

FIG. 1 is a block diagram illustrating a vehicle control apparatus according to an embodiment of the present invention.

A vehicle control apparatus 100 according to an embodiment of the present invention, which is implemented inside a vehicle, may include a V2X communication unit 110, a subject vehicle information measurement unit 120, an object vehicle detection unit 130, a lane information conversion unit 140, and a vehicle control unit 150 for controlling an operation of a subject vehicle, which relates to a lane, using converted second lane information.

Hereinafter, in the present specification, a vehicle to be controlled is referred to as a "subject vehicle" and a vehicle, which generates first lane information and transmits the generated first lane information to the subject vehicle, is referred to as an "object vehicle". However, the present invention is not limited to such terms.

Further, the vehicle control apparatus 100 according to an embodiment of the present invention includes all configurations which receive, from an object vehicle, object vehicle surrounding information including lane information from the viewpoint of the object vehicle or receive, from an infrastructure device, infrastructure surrounding information including lane information from the viewpoint of the infrastructure device, detect a location and a speed of the object vehicle, and then convert the first lane information from the viewpoint of the object vehicle or the infrastructure device into second lane information from the viewpoint of the subject vehicle. That is, the first lane information can be transmitted from the object vehicle or the infrastructure device.

However, hereinafter, for the convenience of the description, it will be representatively described that the first lane information is received from the object vehicle, and the description may be similarly applied to a case where the first lane information is received from the infrastructure device.

The infrastructure device in the present specification may be all devices which are disposed near a road and perform traffic situation identification, vehicle enforcement, information provision, etc., and examples of the infrastructure device may be a wireless beacon, a traffic situation photographing device, enforcement equipment. However, the present invention is not limited thereto.

Hereinafter, a detailed configuration of each block of the vehicle control apparatus 100 illustrated in FIG. 1 according to an embodiment of the present invention will be described in detail.

The V2X communication unit 110 performs a function of receiving object vehicle surrounding information or infrastructure surrounding information including lane information from the viewpoint of an object vehicle or lane information from the viewpoint of the infrastructure device, from the object vehicle or the surrounding infrastructure device, through wireless communication.

The V2X communication unit 110 receives surrounding information including the lane information from the viewpoint of the object vehicle from a wireless communication unit mounted to the object vehicle or the infrastructure device, and an example of schemes of the V2X communication unit 110 is a Wireless Access in Vehicular Environment (WAVE) using a communication frequency of 5.9 GHz, as a form of a multi hop network, but the present invention is not limited thereto.

The object vehicle surrounding information used in the present invention may include relative distance information between the object vehicle and the subject vehicle, relative location information of the subject vehicle, heading angle information of the object vehicle, relative heading angle information between the object vehicle and the subject vehicle, etc. in addition to the lane information from the viewpoint of the object vehicle, but the present invention is not limited thereto. At this time, from the viewpoint of the object vehicle, the subject vehicle may be a target object near the object vehicle.

The lane information from the viewpoint of the object vehicle may be expressed as first lane information in the present invention, and may be coordinate values of a surrounding lane when a location of the object vehicle (center) is configured as a reference point or an original point. That is, when the center of the object vehicle is configured as an original point and a heading direction or a yaw direction of the object vehicle is configured as one (e.g. Y-axis) of coordinate axes, a linear form of a lane may be expressed as Equation f(x,y) which is a function of values of x and y.

That is, an imaging device mounted to the object vehicle can photograph a surrounding lane, measure a current location and a heading direction thereof, generate a function value indicating the lane in a coordinate system based on the object vehicle, and transmit the generated function value to the subject vehicle near the object vehicle.

Further, the lane information from the viewpoint of the object vehicle may include one or more parameters including a coefficient of an equation indicating a linear shape of a lane in an orthogonal coordinate system in which the location of the object vehicle is configured to be an original point and the heading direction of the object vehicle is configured to be an orthogonal axis.

Next, the subject vehicle information measurement unit 120 measures various types of information, a driving speed, heading angle information (yaw angle information), etc. of the subject vehicle, and in particular, the heading angle information can be obtained using a yaw sensor or a yaw rate sensor such as a geomagnetic sensor, etc. Further, when there is a positioning device such as a Global Positioning System (GPS) sensor, the subject vehicle information measurement unit 120 can measure a current location value of the subject vehicle.

In this way, the subject vehicle information measurement unit 120 may include a speed sensor, a geomagnetic sensor (yaw sensor), a positioning sensor, etc., but is not limited thereto. Further, information measured by the subject vehicle information measurement unit 120 may include all types of information used for converting the first lane information received from the object vehicle into the second lane information based on the subject vehicle.

The object vehicle detection unit 130 can calculate the location of the object vehicle using the lane information from the viewpoint of the object vehicle, relative location information of the subject vehicle included in the object vehicle surrounding information, the heading direction of the object vehicle, and the heading direction of the subject vehicle. For example, the object vehicle detection unit 130 can calculate the location of the object vehicle by shifting the lane information from the viewpoint of the object vehicle by a difference between the heading direction of the object vehicle and the heading direction of the subject vehicle and changing the relative location information of the subject vehicle to a reference point. In detail, the object vehicle detection unit 130 can calculate location information of the object vehicle by generating the lane information from the viewpoint of the object vehicle using the heading direction of the subject vehicle, the heading direction of the object vehicle, the relative location information of the subject vehicle. That is, the object vehicle detection unit 130 can estimate, as the location of the object vehicle, a location at which a coefficient of an equation constituting the lane information from the viewpoint of the object vehicle is calculated, using the corresponding coefficient, the heading directions of the object vehicle and the subject vehicle, and the relative location information of the subject vehicle. Meanwhile, speed information of the object vehicle may be received while being included in the above-mentioned object vehicle surrounding information. The object vehicle detection unit 130 can calculate the speed information of the object vehicle through the speed information of the object vehicle. Here, the speed information of the object vehicle may include a difference between speeds of the subject vehicle and the object vehicle.

The lane information conversion unit 140 functions to convert the first lane information from the viewpoint of the object vehicle into the second lane information from the viewpoint of the subject vehicle, using the received object vehicle surrounding information and the vehicle information measured by the measurement unit.

In more detail, the lane information conversion unit 140 may include: a reference point conversion unit 142 for converting a first reference point $(x_0, y_1)$, which is the center of the object vehicle, into a second reference point $(x_r, y_r)$, which is the center of the subject vehicle, using the relative distance information (or the relative location information) and the heading angle information of the object vehicle and the subject vehicle; and a lane information calculation unit 144 for calculating the second lane information on a second coordinate system obtained by configuring the second reference point to be an original point and rotating, by a relative heading angle $(\theta_r)$, the first lane information on a first coordinate system in which the first reference point is configured to be an original point.

A detailed principle of the lane information conversion unit 140 will be described below.

Figure 2:
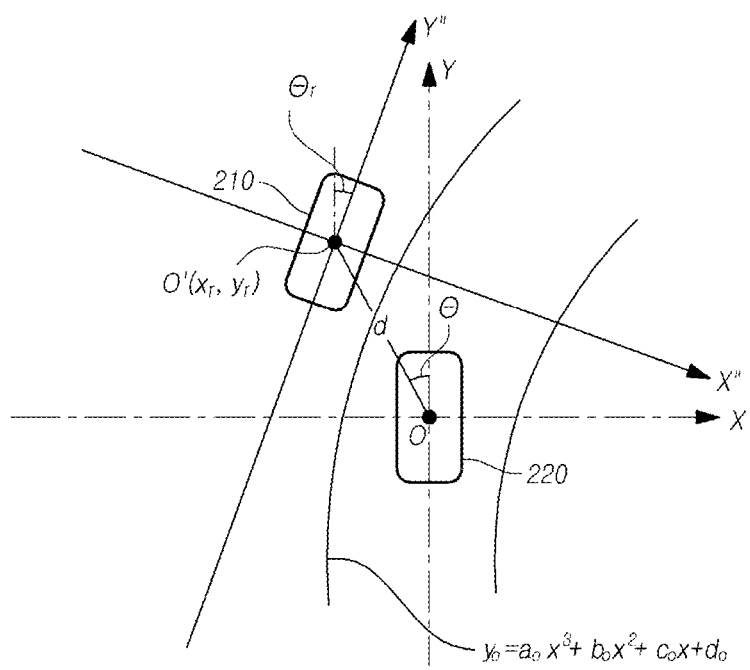
FIG. 2 illustrates a relationship between first lane information and second lane information and a conversion principle of a lane conversion unit.

FIG. 2 illustrates a relationship between first lane information and second lane information and a conversion principle of a lane conversion unit.

Figure 3:
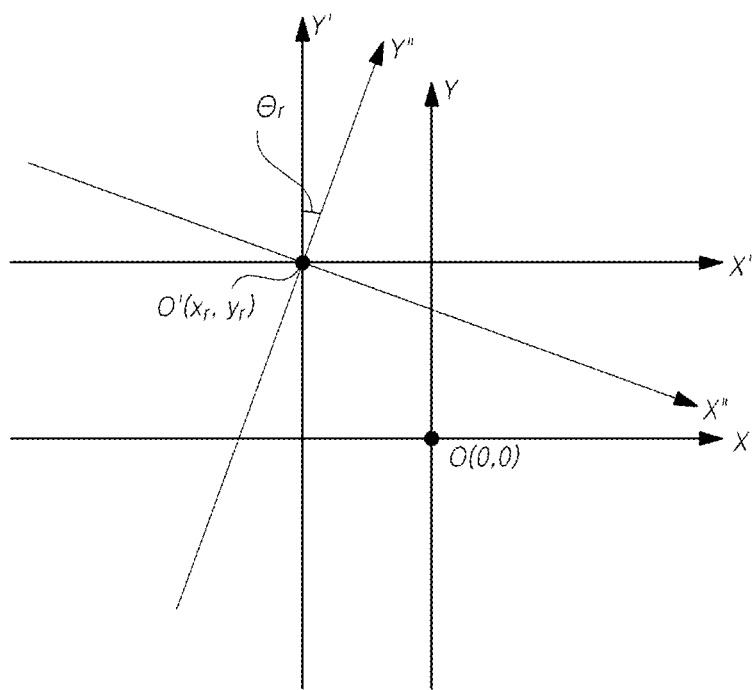
FIG. 3 illustrates various coordinate systems used in an embodiment of the present invention.

Further, FIG. 3 illustrates various coordinate systems used in an embodiment of the present invention.

In FIG. 2, the center of an object vehicle 220 is the first reference point or a first original point 0, and a relative location value $(x_r, y_r)$ of a subject vehicle 210 with respect to the object vehicle 220 is the second reference point or a second original point 0'. That is, the location value of the subject vehicle, which is expressed as coordinate values $(x_r, y_r)$ on the first coordinate system based on the object vehicle 220, becomes the second reference point or the second original point 0' on the second coordinate system based on the subject vehicle 210.

Meanwhile, the object vehicle surrounding information transmitted from the object vehicle 220 includes a d value which is relative distance information between the object vehicle 220 and the subject vehicle 210, and may further include relative location information such as relative angle information $\theta$ or relative coordinate value information $(x_r, y_r)$.

First, the reference point conversion unit 142 of the lane information conversion unit 140 converts the first reference point or the first original point 0 with regard to the center of the object vehicle 220 into the second reference point or the second original point 0' with regard to the subject vehicle 210, using the relative distance information d between the object vehicle 220 and the subject vehicle 210 or the relative location information (i.e. the relative angle information and the relative coordinate value information), which is included in the received object vehicle surrounding information.

Next, the lane information calculation unit 144 of the lane information conversion unit 140 convers a first lane function value f(x, y) defined in the first coordinate system based on the object vehicle 220 into a second lane function value f'(x", y") defined in the second coordinate system based on the subject vehicle 210.

For the convenience, as illustrated in FIG. 3, the first coordinate system based on the object vehicle 220 (i.e. a coordinate system in which the first reference point 0 is configured to be an original point and the heading direction of the object vehicle 220 is configured to be a Y-axis) is expressed as an x-y coordinate system, an intermediate coordinate system obtained by converting only a reference point (original point) from the first reference point to the second reference point by the reference point conversion unit is expressed as an x'-y' coordinate system, and a final second coordinate system obtained by rotating the intermediate coordinate system by a relative heading angle $\theta_r$ is expressed as an x"-y" coordinate system.

That is, as illustrated in FIG. 2, the first lane information included in the surrounding information transmitted by the object vehicle 220 can be expressed as f(x, y) by Equation (1) as follows.

$$f(x,y): y = a_0 x^3 + b_0 x^2 + c_0 x + d_0 \quad (1)$$

Of course, a function indicating a curved line of a lane may be represented not as a cube function of x but as a square function of x. Further, in some cases, the function may be represented as a log function, a hyperbolic function, etc.

In this state, in order to perform coordinate system movement which moves a reference point from the first reference point 0 to the second reference point 0', a coordinate movement relation equation as in Equation (2) can be used.

$$f(x', y') = f(x - x_r, y - y_r) \quad (2)$$

That is, function values in the intermediate coordinate system (x'-y' coordinate system) in which an original point is moved from the first reference point 0 to the second reference point 0' are equal to $(x-x_r, y-y_r)$ which is converted from function values (x, y) in the first coordinate system.

Meanwhile, a coordinate system rotation transformation equation for converting the intermediate coordinate system into the second coordinate system based on the subject vehicle 210 by rotating the intermediate coordinate system by a distance between the heading angles of the object vehicle 220 and the subject vehicle 210, i.e. the relative heading angle $\theta_r$, can be expressed by Equation (3) as follows.

$$\begin{pmatrix} x'' \\ y'' \end{pmatrix} = \begin{pmatrix} \cos\theta_r & -\sin\theta_r \\ \sin\theta_r & \cos\theta_r \end{pmatrix} \begin{pmatrix} x' \\ y' \end{pmatrix} \quad (3)$$

Finally, the lane information calculation unit 144 of the lane information conversion unit 140 convers the first lane function value f(x, y) defined in the first coordinate system based on the object vehicle 220 into a second lane function value f'(x", y") defined in the second coordinate system based on the subject vehicle 210, using Equation (4) as follows.

$$f(x, y): y = a_0 x^3 + b_0 x^2 + c_0 x + d_0 \quad (4)$$
$$\begin{pmatrix} x'' \\ y'' \end{pmatrix} = \begin{pmatrix} \cos\theta_r & -\sin\theta_r \\ \sin\theta_r & \cos\theta_r \end{pmatrix} \begin{pmatrix} x - x_r \\ y - y_r \end{pmatrix}$$

A scheme of converting the first lane information based on the object vehicle 220 into the second lane information based on the subject vehicle 210 by the lane information conversion unit 140 is not limited to Equations (1) to (4), and further, other schemes, which can convert lane information based on the object vehicle 220 transmitted from the object vehicle 220 into lane information based on the subject vehicle 210, may be used.

Meanwhile, the object vehicle 220 may calculate the relative heading angle $\theta_r$ by itself to transmit the calculated relative heading angle $\theta_r$ to the subject vehicle 210. However, the object vehicle 220 may transmit only a heading angle thereof to the subject vehicle 210 and the subject vehicle may calculate the relative heading angle $\theta_r$ by comparing/subtracting the received heading angle with a heading angle of the subject vehicle 210 itself measured thereby.

Further, location values of the subject vehicle 210, which is the second reference point, may be directly measured/calculated by the object vehicle 220 and then transmitted to the subject vehicle 210. However, when the object vehicle 220 and the subject vehicle 210 can measure absolute positioning values, the object vehicle 220 can transmit only location information (x, y) thereof, and the subject vehicle 210 can measure a current location thereof and then calculate relative location values $(x_r, y_r)$ thereof.

Further, the object vehicle 220 may measure a relative distance d to the subject vehicle 210 to be measured and/or angle information ($\theta$ in FIG. 2) with respect to the subject vehicle 210, using a radar sensor, etc., and then the measured result to the subject vehicle. Further, the object vehicle 220 may calculate relative location values $(x_r, y_r)$ using a relative distance d and angle information ($\theta$ in FIG. 2) received from the subject vehicle 210.

As described above, in the present embodiment, the lane information from the viewpoint of the object vehicle 220, i.e. the first lane information, may be information deduced by a lane inclusion image photographed by an imaging device installed in the object vehicle and may be an equation representing a lane in a linear shape in an orthogonal coordinate system in which the location of the object vehicle is configured to be an original point or a parameter such as a coefficient constituting the corresponding equation.

Further, the object vehicle surrounding information transmitted by the object vehicle may include one or more of the relative distance information between the object vehicle and the subject vehicle, the relative location information, the heading angle information of the object vehicle, and the relative heading angle information of the object vehicle and the subject vehicle, which are measured by a wireless proximity sensor (e.g. a radar, an ultrasonic sensor, etc.) installed in the object vehicle 220.

As described above, when the second lane information is calculated by the lane information conversion unit 140, a location and a shape of a vehicle near the subject vehicle 210 can be identified, and accordingly, the vehicle control unit 150 of the subject vehicle 210 performs a vehicle control relating to a lane using the identified lane information.

The lane related control performed by the vehicle control unit 150 may be one or more of LKA, Lane Departure Warning (LDW), and LCA, but is not limited thereto. Further, the lane related control may include all types of vehicle controls which identify a location and a speed of the object vehicle and the second lane information based on the subject vehicle on the basis of the lane information received from the object vehicle or an infrastructure device through V2X communication, and use the identified information.

In the detailed description of an LKA function performed by the vehicle control unit 150, the LKA function may imply a function of actively controlling a steering system to perform autonomous driving such that the subject vehicle 210 is driven within a current lane or forcibly driving the steering system when the subject vehicle 210 attempts to deviate from a lane to prevent lane deviation, on the basis of the location and speed information of the object vehicle, which is detected by the object vehicle detection unit 130, or the second lane information converted by the lane information conversion unit 140.

The LDW function performed by the vehicle control unit 150 may imply a function of providing a warning to a driver by means of a sound, an image, or vibration when a probability that the subject vehicle deviates from a current lane is high, on the basis of the location and speed information of the object vehicle and the second lane information.

Meanwhile, the LCA function performed by the vehicle control unit 150 may imply a function of outputting, to a surrounding object vehicle, a lane change display signal indicating lane change when it is predicted that the subject vehicle changes a current driving lane thereof, on the basis of the location and speed information of the object vehicle and the second lane information. At this time, the lane change display signal may be a flickering signal such as a turn signal in a lane change prediction direction, but is not limited thereto.

That is, the LCA function is a function of forcibly outputting a lane change display signal such as a turn signal which a driver of the object vehicle can identify, when a driver does not operate a turn signal lamp even when lane change is predicted by a vehicle behavior change.

Meanwhile, the vehicle control apparatus 100 may further include a display control unit for making a control to equally display the size of the subject vehicle and distinguishably display the size and the color of the object vehicle on the basis of the detected relative distance between the object vehicle and the subject vehicle. For example, the display control unit can make a control to reduce the size of the object vehicle in a constant pattern or in a constant ratio as the object vehicle approaches the subject vehicle. Otherwise, the display control unit can make a control to distinguishably display the color of the object vehicle as the object vehicle approaches the subject vehicle. Only one of the above-described controls of the size and the color of the object vehicle may be performed, or two thereof may be performed in a combined scheme.

Meanwhile, although the object vehicle surrounding information transmitted by the object vehicle has been described in the above embodiment, the present invention can be equally applied even when infrastructure device surrounding information transmitted by the infrastructure device instead of the object vehicle is used.

That is, another embodiment of the present invention is to provide a vehicle control apparatus including: a communication unit for receiving, from an infrastructure device near a vehicle, infrastructure device surrounding information including lane information from the viewpoint of the infrastructure device through wireless communication; a measurement unit for measuring vehicle information of a subject vehicle; a lane information conversion unit for converting the first lane information from the viewpoint of the infrastructure device into second lane information from the viewpoint of the subject vehicle using the received infrastructure device surrounding information and the vehicle information measured by the measurement unit; and a vehicle control unit for controlling an operation of the subject vehicle relating to a lane using the converted second lane information.

At this time, since the communication unit, the measurement unit, the lane information conversion unit, and the vehicle control unit can be operated equally to the above-described functions of the corresponding components of the vehicle control apparatus in FIG. 1, a detailed description thereof will be omitted.

Further, the vehicle control apparatus according to the present invention may convert the first lane information received from the object vehicle or the infrastructure device into the second lane information based on the subject vehicle, reflect the converted second lane information on map information used within the subject vehicle, and then display the map information on a display device, etc.

For example, the subject vehicle may include equipment including map information, such as a navigation device, dynamically generate and update the map information by reflecting the second lane information converted in the above-described scheme on the map information, and display existence, a location, etc. of the object vehicle on the navigation device or other display devices.

Figure 4:
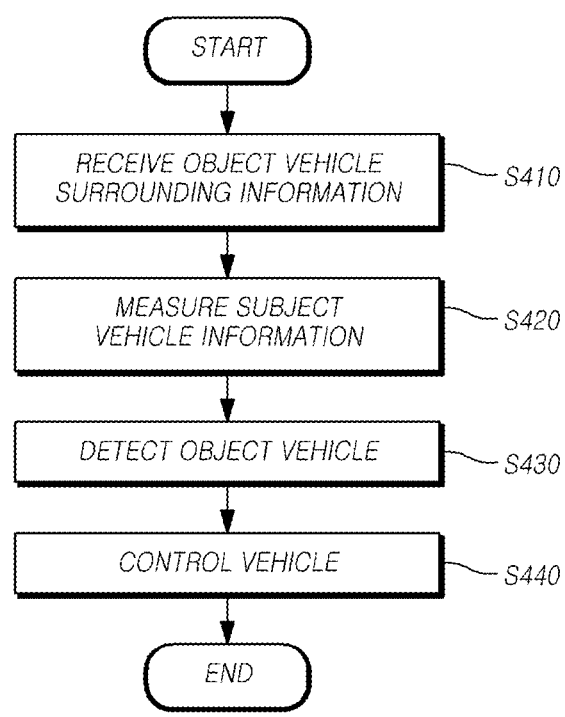
FIG. 4 is a flowchart illustrating a method of controlling a vehicle according to an embodiment of the present invention.

FIG. 4 is a flowchart illustrating a method of controlling a vehicle according to an embodiment of the present invention.

As illustrated in FIG. 4, a method of controlling a vehicle according to an embodiment of the present invention may include: an object vehicle surrounding information reception step S410 of receiving, from an object vehicle, object vehicle surrounding information including lane information from the viewpoint of the object vehicle through V2X wireless communication; a subject vehicle information measurement step S420 of measuring vehicle information of a subject vehicle; an object vehicle detection step S430 of detecting a location and a speed of the object vehicle using the received object vehicle surrounding information and the measured subject vehicle information; and a vehicle control step S440 of controlling an operation of the subject vehicle using information on the location and the speed of the object vehicle.

In the above flowchart, a sequence of the other vehicle surrounding information reception step S410 and a sequence of the subject vehicle information measurement step S420 may be exchanged.

The above-described lane information from the viewpoint of the object vehicle, which is received in the object vehicle surrounding information reception step S410, corresponds to information derived from a lane inclusion image photographed by the imaging device installed in the object vehicle, and more particularly, corresponds to an equation representing a linear shape of a lane in an orthogonal coordinate system in which a location of the object vehicle is configured to be an original point and a heading direction of the object vehicle is configured to be one orthogonal axis, or a parameter such as a coefficient constituting the corresponding equation.

Further, information included in the object vehicle surrounding information may include relative distance information between the object vehicle and the subject vehicle, relative location information, heading angle information of the object vehicle, and relative heading angle information of the object vehicle and the subject vehicle, which are measured by a wireless proximity sensor installed in the object vehicle.

The object vehicle detection step S430 can calculate the location of the object vehicle using the lane information from the viewpoint of the object vehicle, relative location information of the subject vehicle included in the object vehicle surrounding information, the heading direction of the object vehicle, and the heading direction of the subject vehicle. For example, the object vehicle detection step S430 can calculate the location of the object vehicle by shifting the lane information from the viewpoint of the object vehicle by a difference between the heading direction of the object vehicle and the heading direction of the subject vehicle and changing the relative location information of the subject vehicle to a reference point. In detail, the object vehicle detection step S430 can estimate, as the location of the object vehicle, a location at which a coefficient of an equation constituting the lane information from the viewpoint of the object vehicle is calculated, using the corresponding coefficient, the heading directions of the object vehicle and the subject vehicle, and the relative location information of the subject vehicle.

Meanwhile, vehicle controls in the vehicle control step S440 include all controls based on information on the location and the speed of the object vehicle and related to a lane, and more particularly, includes an LKA function of actively controlling a steering system such that the subject vehicle performs driving within a current lane, an LDW function of performing a warning when a probability that the subject vehicle deviates from a current lane is high, and an LCA function of outputting, to a surrounding object vehicle, a lane change display signal indicating lane change when it is predicted that the subject vehicle changes a current driving lane thereof.

Figure 5:
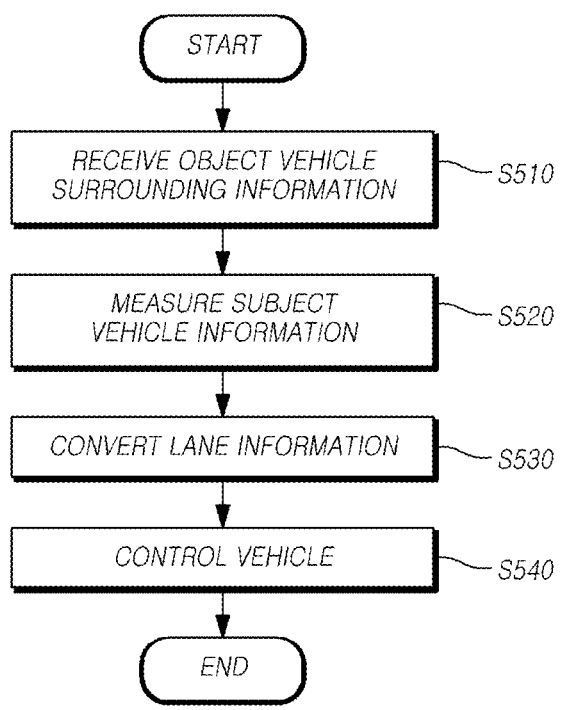
FIG. 5 is a flowchart illustrating a vehicle control method according to another embodiment of the present invention.

FIG. 5 is a flowchart illustrating a vehicle control method according to another embodiment of the present invention.

As illustrated in FIG. 5, a method of controlling a vehicle according to another embodiment of the present invention may include: an object vehicle surrounding information reception step S510 of receiving, from an object vehicle, object vehicle surrounding information including lane information from the viewpoint of the object vehicle through V2X wireless communication; a subject vehicle information measurement step S520 of measuring vehicle information of a subject vehicle; a lane information conversion step S530 of converting first lane information from the viewpoint of the object vehicle into second lane information from the viewpoint of the subject vehicle, using the received object vehicle surrounding information and the measured subject vehicle information; and a vehicle control step S540 of controlling an operation of the subject vehicle, relating to the subject vehicle, using the converted second lane information.

In the above flowchart, a sequence of the other vehicle surrounding information reception step S510 and a sequence of the subject vehicle information measurement step S520 may be exchanged.

The above-described lane information from the viewpoint of the object vehicle, which is received in the object vehicle surrounding information reception step (S410), corresponds to information derived from a lane inclusion image photographed by the imaging device installed in the object vehicle, and more particularly, corresponds to a linear equation representing a linear shape of a lane in an orthogonal coordinate system in which a location of the object vehicle is configured to be an original point and a heading direction of the object vehicle is configured to be one orthogonal axis.

Further, information included in the object vehicle surrounding information may include relative distance information between the object vehicle and the subject vehicle, relative location information, heading angle information of the object vehicle, relative heading angle information of the object vehicle and the subject vehicle, which are measured by a wireless proximity sensor installed in the object vehicle.

The lane information conversion step S530 may be a process of converting a first reference point (x0, y0) which is the center of the object vehicle into a second reference point (xr, yr) which is the center of the subject vehicle, using the relative distance information, the relative location information, the heading angle information of the object vehicle, and the relative heading angle information of the object vehicle and the subject vehicle, and calculating the second lane information on the second coordinate system obtained by configuring the second reference point to be an original point and rotating the first coordinate system by the relative heading angle $\theta_r$, on the basis of the first lane information on the first coordinate system in which the first reference point is configured to be an original point. At this time, the conversion may be performed by Equation (4) which is described above.

Meanwhile, vehicle controls in the vehicle control step S540 includes all controls which are based on the converted second lane information and are related to a lane, and more particularly, includes an LKA function of actively controlling a steering system such that the subject vehicle performs driving within a current lane, an LDW function of performing a warning when a probability that the subject vehicle deviates from a current lane is high, and an LCA function of outputting, to a surrounding object vehicle, a lane change display signal indicating lane change when it is predicted that the subject vehicle changes a current driving lane thereof.

As described above, according to the vehicle control technology according to an embodiment of the present invention, a specific vehicle does not include an imaging device and/or a wireless proximity sensor (a radar sensor, etc.), so that even a vehicle, which cannot acquire lane and surrounding information, can receive necessary information from an object vehicle or a surrounding infrastructure device, and generate and use lane information based on the vehicle on the basis of the received information.

Thus, when the vehicle, not including an imaging device and a radar sensor, can perform V2X communication, even the vehicle can identify a shape and a location of an lane using the information received from the object vehicle or the infrastructure device, and then perform a lane-related vehicle control such as an LKA function, an LDW function and an LCA function.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention. Although the embodiments of the present invention have been described for illustrative purposes, those skilled in the art will appreciate that various modifications, additions and substitutions are possible, without departing from the scope and spirit of the invention. The scope of the present invention shall be construed on the basis of the accompanying claims in such a manner that all of the technical ideas included within the scope equivalent to the claims belong to the present invention.

What is claimed is:

1. An apparatus for controlling a subject vehicle, the apparatus comprising:
   a communication unit included in the subject vehicle and receiving, from an object vehicle, object vehicle surrounding information including lane information from a viewpoint of the object vehicle, through wireless communication;
   a measurement unit measuring vehicle information of the subject vehicle;
   an object vehicle detection unit detecting a location and a speed of the object vehicle, using the object vehicle surrounding information received from the object vehicle through the wireless communication and the vehicle information of the subject vehicle; and
   a vehicle control unit controlling an operation of the subject vehicle using information on the location and the speed of the object vehicle,
   wherein the lane information from the viewpoint of the object vehicle corresponds to one or more parameters including a coefficient of an equation indicating a linear shape of a lane in an orthogonal coordinate system in which a location of the object vehicle is configured to be an original point and a heading direction of the object vehicle is configured to be an orthogonal axis.

2. The apparatus of claim 1, wherein the lane information from the viewpoint of the object vehicle is information derived from a lane inclusion image photographed by an imaging device installed in the object vehicle.

3. The apparatus of claim 1, wherein the object vehicle surrounding information comprises one or more of relative distance information between the object vehicle and the subject vehicle, relative location information of the subject vehicle, heading angle information of the object vehicle, and relative heading angle information of the object vehicle and the subject vehicle.

4. The apparatus of claim 1, wherein the object vehicle detection unit calculates the location of the object vehicle, using lane information from the viewpoint of the object vehicle, the relative location information of the subject vehicle included in the object vehicle surrounding information, a heading direction of the object vehicle, and a heading direction of the subject vehicle.

5. The apparatus of claim 4, wherein the object vehicle detection unit calculates the location of the object vehicle, by shifting the lane information from the viewpoint of the object vehicle by a difference between the heading direction of the object vehicle and the heading direction of the subject vehicle and changing the relative location information of the subject vehicle to a reference point.

6. The apparatus of claim 1, wherein the vehicle control unit performs a Lane Keeping Assistance (LKA) function of actively controlling a steering system such that the subject vehicle is driven within a current lane, on the basis of the information on the location and the speed of the object vehicle.

7. The apparatus of claim 1, wherein the vehicle control unit performs a Lane Departure Warning (LDW) function of performing a warning when a probability that the subject vehicle deviates from a current lane is high, on the basis of the information on the location and the speed of the object vehicle.

8. The apparatus of claim 1, wherein the vehicle control unit performs a Lane Change Assistance (LCA) function of outputting, to a surrounding object vehicle, a lane change display signal indicating lane change when the subject vehicle changes a current lane thereof, on the basis of the information on the location and the speed of the object vehicle.

9. The apparatus of claim 1, further comprising a display control unit making a control to equally display a size of the subject vehicle and distinguishably display a size and a color of the object vehicle on the basis of a relative distance between the object vehicle and the subject vehicle.

10. An apparatus for controlling a subject vehicle, the apparatus comprising:
a communication unit included in the subject vehicle and receiving, from an object vehicle, object vehicle surrounding information including lane information from a viewpoint of the object vehicle, through wireless communication;
a measurement unit measuring vehicle information of the subject vehicle;
an object vehicle detection unit detecting a location and a speed of the object vehicle, using the object vehicle surrounding information received from the object vehicle through the wireless communication and the vehicle information of the subject vehicle;
a vehicle control unit controlling an operation of the subject vehicle using information on the location and the speed of the object vehicle; and
a lane information conversion unit converting first lane information from the viewpoint of the object vehicle into second lane information from a viewpoint of the subject vehicle, using the received object vehicle surrounding information of the object vehicle and the vehicle information of the subject vehicle measured by the measurement unit, wherein the lane information conversion unit comprises:
a reference point conversion unit converting a first reference point (x0, y0), which is the center of the object vehicle, into a second reference point (xr, yr), which is the center of the subject vehicle, using the relative distance information between the object vehicle and the subject vehicle, the relative location information, the heading angle information of the object vehicle, and the relative heading angle information of the object vehicle and the subject vehicle; and
a lane information calculation unit calculating the second lane information on a second coordinate system obtained by configuring the second reference point to be an original point and rotating, by a relative heading angle ($\theta r$), the first lane information on a first coordinate system in which the first reference point is configured to be an original point.

11. A method of controlling a subject vehicle, the method comprising:
receiving, by the subject vehicle, object vehicle surrounding information of an object vehicle including lane information from a viewpoint of the object vehicle, through wireless communication, from the object vehicle;
measuring vehicle information of the subject vehicle;
detecting a location and a speed of the object vehicle, using the object vehicle surrounding information received from the object vehicle through the wireless communication and the measured vehicle information of the subject vehicle; and
controlling an operation of the subject vehicle using information on the location and the speed of the object vehicle,
wherein the lane information from the viewpoint of the object vehicle corresponds to one or more parameters including a coefficient of an equation indicating a linear shape of a lane in an orthogonal coordinate system in which a location of the object vehicle is configured to be an original point and a heading direction of the object vehicle is configured to be an orthogonal axis.

12. A method of controlling a subject vehicle, the method comprising:
receiving, by the subject vehicle, object vehicle surrounding information of an object vehicle including lane information from a viewpoint of the object vehicle, through wireless communication, from the object vehicle;
measuring vehicle information of the subject vehicle;
converting first lane information from the viewpoint of the object vehicle into second lane information from a viewpoint of the subject vehicle, using the received object vehicle surrounding information of the object vehicle and the measured vehicle information of the subject vehicle; and
controlling an operation of the subject vehicle, relating to a lane, using the converted second lane information of the subject vehicle,
wherein the converting the first lane information from the viewpoint of the object vehicle into the second lane information from the viewpoint of the subject vehicle comprises converting a first reference point (x0, y0), which is the center of the object vehicle, into a second reference point (xr, yr), which is the center of the subject vehicle, using the relative distance information between the object vehicle and the subject vehicle, the relative location information, the heading angle information of the object vehicle, and the relative heading angle information of the object vehicle and the subject vehicle; and calculating the second lane information on a second coordinate system obtained by configuring the second reference point to be an original point and rotating, by a relative heading angle (θr), the first lane information on a first coordinate system in which the first reference point is configured to be an original point.

* * * * *